(No Model.)
F. B. JONES.
CULTIVATOR.
No. 395,329. Patented Jan. 1, 1889.
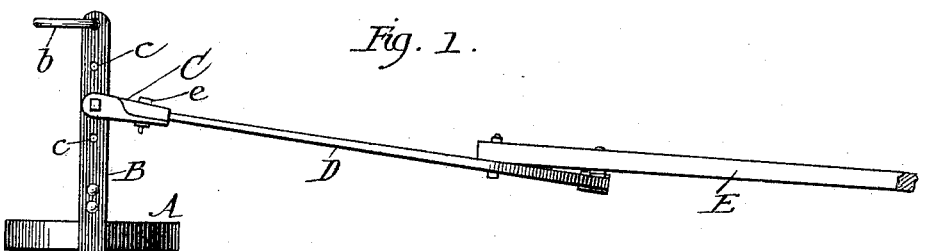
Fig. 1.
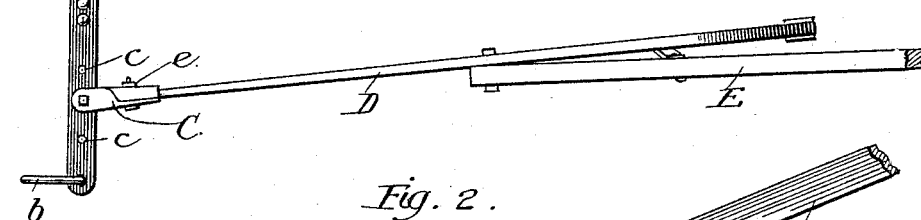
Fig. 2.
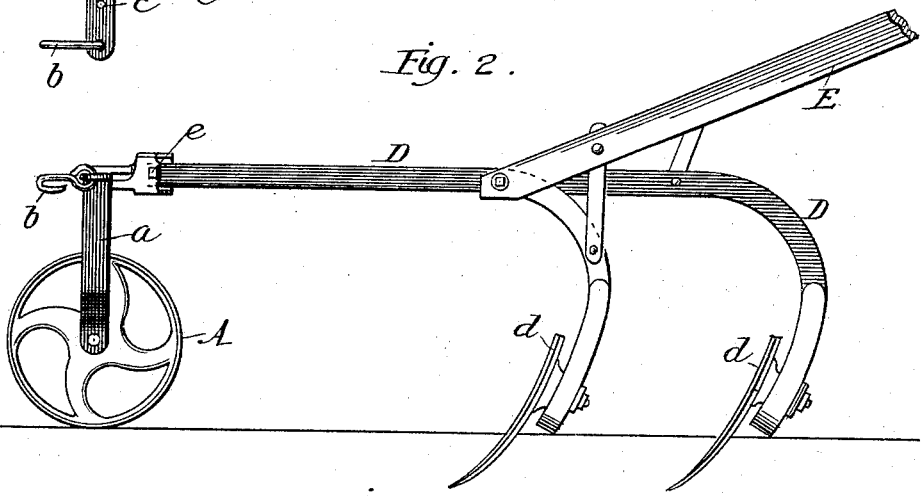
Fig. 3.
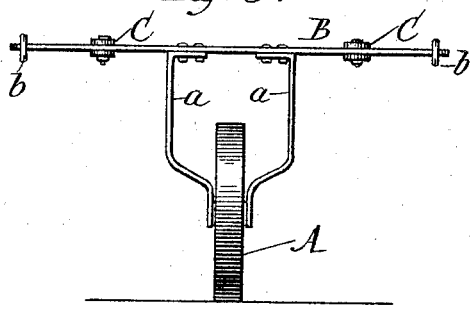
Witnesses:
Chas. F. Boland
H. C. Clark
Inventor:
Fred B. Jones

United States Patent Office.

FRED B. JONES, OF DALLAS, TEXAS, ASSIGNOR TO HIMSELF, AND THE ROCK ISLAND PLOW COMPANY, OF ROCK ISLAND, ILLINOIS.

CULTIVATOR.

SPECIFICATION forming part of Letters Patent No. 395,329, dated January 1, 1889.

Application filed October 1, 1888. Serial No. 286,841. (No model.)

*To all whom it may concern:*

Be it known that I, FRED B. JONES, residing at Dallas, in the county of Dallas and State of Texas, and a citizen of the United States, have invented a new and useful Improvement in Cultivators, of which the following is a specification, reference being had to the accompanying drawings, in which—

Figure 1 is a plan view. Fig. 2 is a side elevation. Fig. 3 is a front elevation.

This invention relates to that class of walking-cultivators or shovel-plows which are drawn by a single horse between two rows of plants, and which are frequently called "double-shovel plows."

The leading object of the invention is to provide such a cultivator with two beams, each carrying a shovel, which beams are independently capable of vertical and lateral movements, whereby the operator can guide or lift the beams and shovels to avoid plants or obstacles, which I accomplish as illustrated in the drawings and hereinafter described.

That which I claim as new will be pointed out in the claims.

In the drawings, A represents a wheel.

B is a cross-bar.

*a a* are two brackets, which support the cross-bar B near its center upon the axle of the wheel A.

*b b* are two hooks secured to the cross-bar B, one near each end, to which the traces are to be attached.

C C are two couplings, which are pivotally attached to the cross-bar B, one near each end, by bolts passing through holes *c* in the cross-bar. Several holes, *c*, are provided in each end of the cross-bar B, to permit the couplings C to be attached thereto at any desired distance apart.

D D are two beams, to each of which a shovel, *d*, is attached. Each beam D is pivotally attached to one of the couplings C by a bolt, *e*, permitting the beam to swing vertically.

E E are two handles, one attached to each beam D.

In use the cross-bar B is drawn forward at or nearly at right angles to the row of plants. The operator guides the shovels by the handles E. The couplings C permit the beams D to be swung vertically or laterally independently of each other, so that the operator can guide or lift the shovels *d*, together or independently, to pass plants which are out of line, to avoid stones or other obstacles, or to take out weeds between the adjoining plants of a row. The two beams D being independently movable both vertically and laterally the operator can move either one or both, as desired, which is a great advantage over the common double-shovel cultivator having its shovel-beams connected together. The adjusting-holes *c* in the cross-bar B permit the shovel-beams D to be set at any desired distance apart according to the width of the space between two rows.

I am aware that straddle-row cultivators have been made having beams and shovels which can be moved laterally and vertically, and I do not claim such construction. Such straddle-row cultivators require two wheels and a high arch, and are drawn by two horses.

What I claim as new, and desire to secure by Letters Patent, is—

1. In a cultivator, the combination of a wheel, A, brackets *a*, cross-bar B, supported by the brackets *a*, two couplings, C, and two shovel-beams, D, each carrying a shovel, *d*, and each provided with a handle, E, whereby the shovels and beams can be moved independently both vertically and laterally, substantially as and for the purposes specified.

2. In a cultivator, the combination of a wheel, A, brackets *a*, cross-bar B, supported near its center by the brackets *a*, and provided with adjusting-holes *c* on each side of the brackets *a*, two couplings, C, and two shovel-beams, D, independent of each other, and each provided with a handle, E, and carrying a shovel, *d*, substantially as and for the purposes specified.

FRED B. JONES.

Witnesses:
THOS. FIELD,
JNO. BURKHART.